United States Patent [19]

Taylor

[11] Patent Number: 5,517,570
[45] Date of Patent: May 14, 1996

[54] SOUND REPRODUCING ARRAY PROCESSOR SYSTEM

[75] Inventor: Stephen F. Taylor, Pacific Palisades, Calif.

[73] Assignee: Taylor Group of Companies, Inc., Santa Monica, Calif.

[21] Appl. No.: 166,463

[22] Filed: Dec. 14, 1993

[51] Int. Cl.$^6$ ........................... H04S 5/02
[52] U.S. Cl. ........................... 381/18; 381/23
[58] Field of Search ................. 381/18, 24, 63, 381/90, 103, 182, 188, 23

[56] References Cited

U.S. PATENT DOCUMENTS

| | | | |
|---|---|---|---|
| 4,236,039 | 11/1980 | Cooper | 381/23 |
| 4,497,023 | 1/1985 | Moorer | 364/200 |
| 4,685,134 | 8/1987 | Wine | 381/17 |
| 4,736,333 | 4/1988 | Mead et al. | 364/736 |
| 4,818,938 | 4/1989 | Sattin et al. | 324/309 |
| 4,893,256 | 1/1990 | Ruterfoord et al. | 364/518 |
| 4,905,094 | 2/1990 | Popcock et al. | 358/342 |
| 4,933,768 | 6/1990 | Ishikawa et al. | 381/23 |
| 5,065,345 | 11/1991 | Knowles et al. | 395/154 |
| 5,109,482 | 4/1992 | Bohrman | 395/154 |
| 5,111,409 | 5/1992 | Gasper et al. | 395/152 |
| 5,119,474 | 6/1992 | Beitel et al. | |
| 5,119,479 | 6/1992 | Beitel et al. | 395/154 |
| 5,233,664 | 8/1993 | Yanagawa et al. | 381/182 |

*Primary Examiner*—Stephen Brinich
*Attorney, Agent, or Firm*—Merchant, Gould, Smith, Edell, Welter & Schmidt

[57] ABSTRACT

A method and apparatus for dynamic, adaptive mapping of three-dimensional aural phenomenon to a two-dimensional sound reproducing surface. The surface is comprised of sound pixels that are discrete, addressable output locations. Actual or synthetic recorded audio material is decomposed into discrete sound sources which are then mapped to the sound pixels. This mapping occurs during the production phase by means of computer-aided design (CAD) system. The CAD system guides the sound designer in the implementation of complex acoustical designs by automating the most complex and computationally intensive functions. The mapping function can be extended to integrate real-time human interaction, ultimately creating a participatory, interactive virtual sound environment.

15 Claims, 19 Drawing Sheets

5,517,570

SOUND REPRODUCING ARRAY PROCESSOR SYSTEM

BACKGROUND OF THE INVENTION

1. Field of the Invention

This invention relates in general to multi-channel audio production, editing and playback systems.

2. Description of Related Art

As with light sources, sound sources possess a spectral signature. Recent research has revealed the non-periodic nature of many acoustical waveforms, despite the preponderance of observable fundamentals and harmonics. The spectral signatures of real-world sound sources have been shown to change over time, particularly when it is viewed in terms of decay and reflection through boundaries. However, current sound reproduction systems have proved inadequate in the characterization of sound sources which are, by nature, dynamic entities.

With the continuing evolution of digital audio technology, breakthroughs seem to be commonplace in sound reproduction methods. In truth, however, it is not really possible to introduce real innovation into audio entertainment without controlling the recording/playback chain. This is quite significant since it is well known in high-end consumer audio circles that the truly difficult task in the design of audio equipment is not the creation of sound stage depth, but rather, the realistic and accurate preservation of horizontal and vertical location of objects and events.

Careful attention to the phase response of the reproduction chain can do much to resolve the perceived depth of a recording. The "distance back" aspect of reproduction requires the preservation of very subtle timing relationships within the recorded material, often as small as microseconds. As a design task, this is less difficult to execute than to project the more complex and subtle cues that convey XY plane location and "vaulting" ambience. The accurate re-creation of the true ambient "feel" of a real-world sonic event requires the neutral transfer of a great amount of information, i.e., electronically encoded cues that, when replayed, provide the illusion of "liveness".

The preservation of the subtle minutiae that convey accurate spacing and size of the recorded events is also important. In a channel reproduction system, this is exceedingly difficult to do. On the production side, the illusions of XY plane location, and even size and space, are projected by means of ingenious but often tortuous production techniques. For example, the continued development of surround sound technology extends and enhances these methods. Still, these techniques are attempts to ameliorate problems inherited from earlier, more primitive technology. In any case, the efforts are largely wasted in that the vast majority of venue playback systems lack even rudimentary elements of good sonic designs.

SUMMARY OF THE INVENTION

To overcome the limitations in the references described above, and to overcome other limitations that will become apparent upon reading and understanding the present specification, the present invention discloses a method and apparatus for a dynamic, adaptive mapping of three-dimensional aural phenomenon to a two-dimensional sound reproducing surface comprised of sound pixels that are discrete, addressable output locations. In the present invention, actual or synthetic recorded audio material is decomposed into discrete sound sources which are then mapped to the sound pixels. This mapping occurs during the production phase by means of computer-aided design (CAD) system. The CAD system guides the sound designer in the implementation of complex acoustical designs by automating the most complex and computationally intensive functions. The goal of this system is maximum flexibility and power for experienced audio engineers, while maintaining an high standard of useability. In more advanced implementations, the present invention extends the mapping function to integrate real-time human interaction, ultimately creating a participatory, interactive virtual sound environment.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 1:
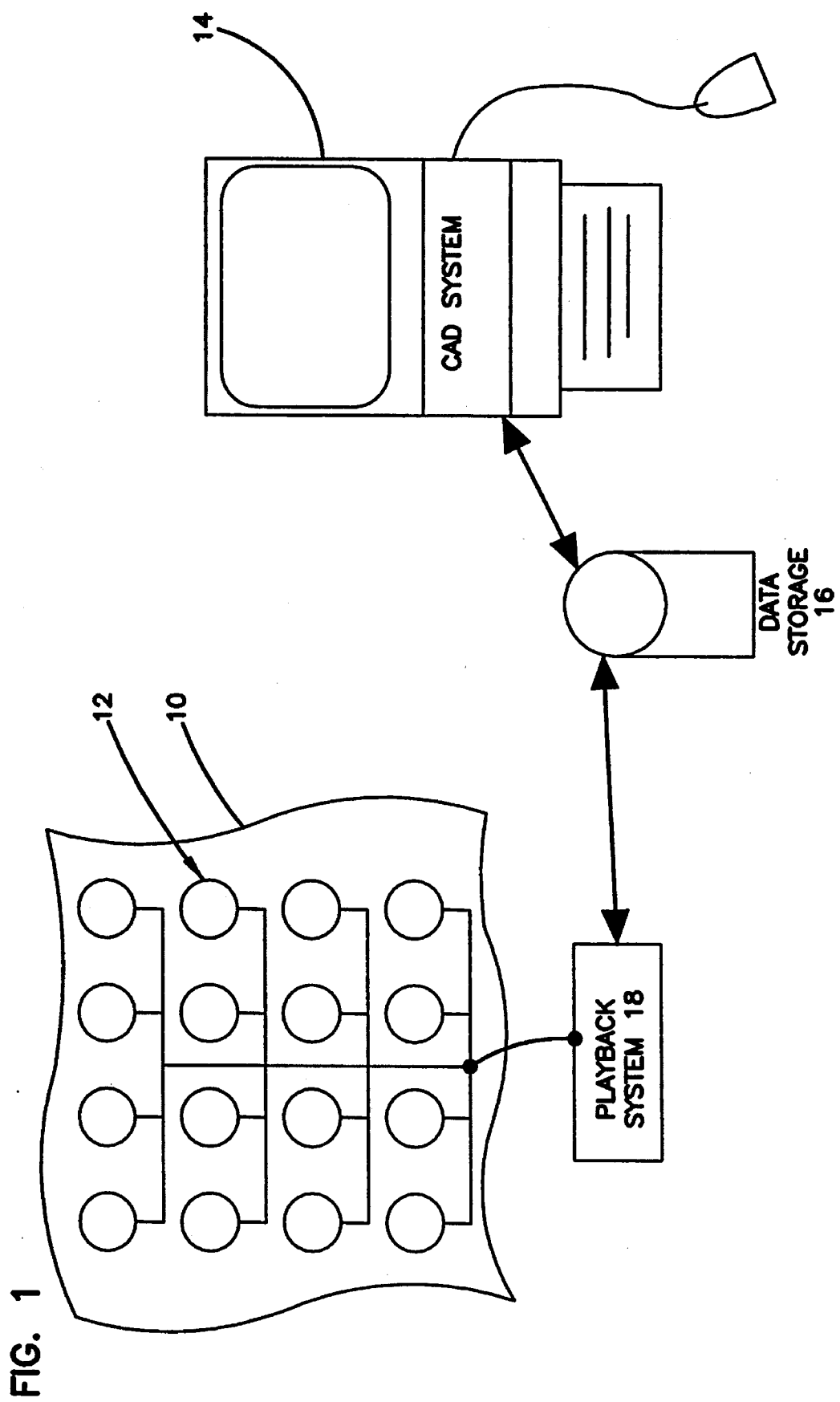
FIG. 1 is a block diagram illustrating the basic components of the present invention.

FIG. 1 is a block diagram illustrating the basic components of the present invention. The present invention is intended to have applications in several markets, ranging from special venue entertainment markets such as video arenas and theme parks, to more commonplace markets such as concert halls, theatres and video games. In the present invention, a two-dimensional planar surface 10 comprised of sound reproducing elements called sound pixels 12 is used to reproduce 3-dimensional aural phenomenon. Like pixels in visual imaging systems, the sound pixels 12 together produce an "aural image" or "sonic tapestry". The sound pixels 12 each comprise a discrete, addressable output location, wherein audio material is decomposed into a plurality of discrete sound data streams that are mapped to the sound pixels 12.

The data streams that control the sound pixels are created using a computer-aided design (CAD) system 14 that guides a sound designer through the modeling of the acoustical playback environment. The CAD system 14 is used by the sound designer to create a virtual acoustical environment (VAE) modeled on the actual acoustical environment, of the playback venue to automate the capture or creation of propagating acoustical energy within the modeled environment, and to transform this captured acoustical energy into digital data streams for playback purposes. The CAD system 14 allows the sound designer to simulate real-world ambience and re-create the tangible events that form the basis for spatial perception of sound. Physical conditions associated with the VAE, including temporal and spectral characteristics, can be modeled by the CAD system 14.

Audio material is "painted" onto a digital representation of the sound reproducing surface 10 in the CAD system 14, rather like an artist lays brush strokes on a canvas. Another way to look at the present invention is as a discrete-time digital sound stage, wherein the sound designer assumes the role of stage director, placing objects in areas on a stage and orchestrating their interaction. Moreover, the CAD system 14 re-creates the interaction of multiple sound objects with one another, so that the additive nature of real-world sonic waveform interaction can be reproduced. Thereafter, the sound objects can be propagated through the VAE to represent changes in location for the sound producing entity. Once location and movement of sound objects within the VAE has been specified, the audio material is compiled and placed in a high density storage device 16, such as a hard disc drive or optical disc. The audio material typically comprises discrete data streams that are mapped onto or assigned to the sound pixels 12. The CAD system 14 creates the digital data streams for the sound pixels 12 with the same characteristics of real-world sound events in a real environment.

During playback, the data streams created by the CAD system 14 are retrieved from the storage device 16, processed, and then transmitted to the sound pixels 12 to reproduce a 3-dimensional aural phenomenon. Each sound pixel 12 contains a full range audio transducer that reproduces sound energy under control of the data streams. The playback of the audio material can be accomplished in either static or dynamic modes.

In static mode, the data streams that comprise the audio material are "static" in that it is not altered once completed. The operator simply activates the playback system 18 and the audio material is replayed through the sound reproducing surface 10, possibly in synchronism with an accompanying video program. Sound objects can move through space and locations during playback by the data streams sequentially addressing different pixels 12 in the surface 10. In dynamic mode, the present invention extends the implementation of static mode to include real-time interaction, thereby creating participatory sound environments.

Computer-Aided Design System

Figure 2:
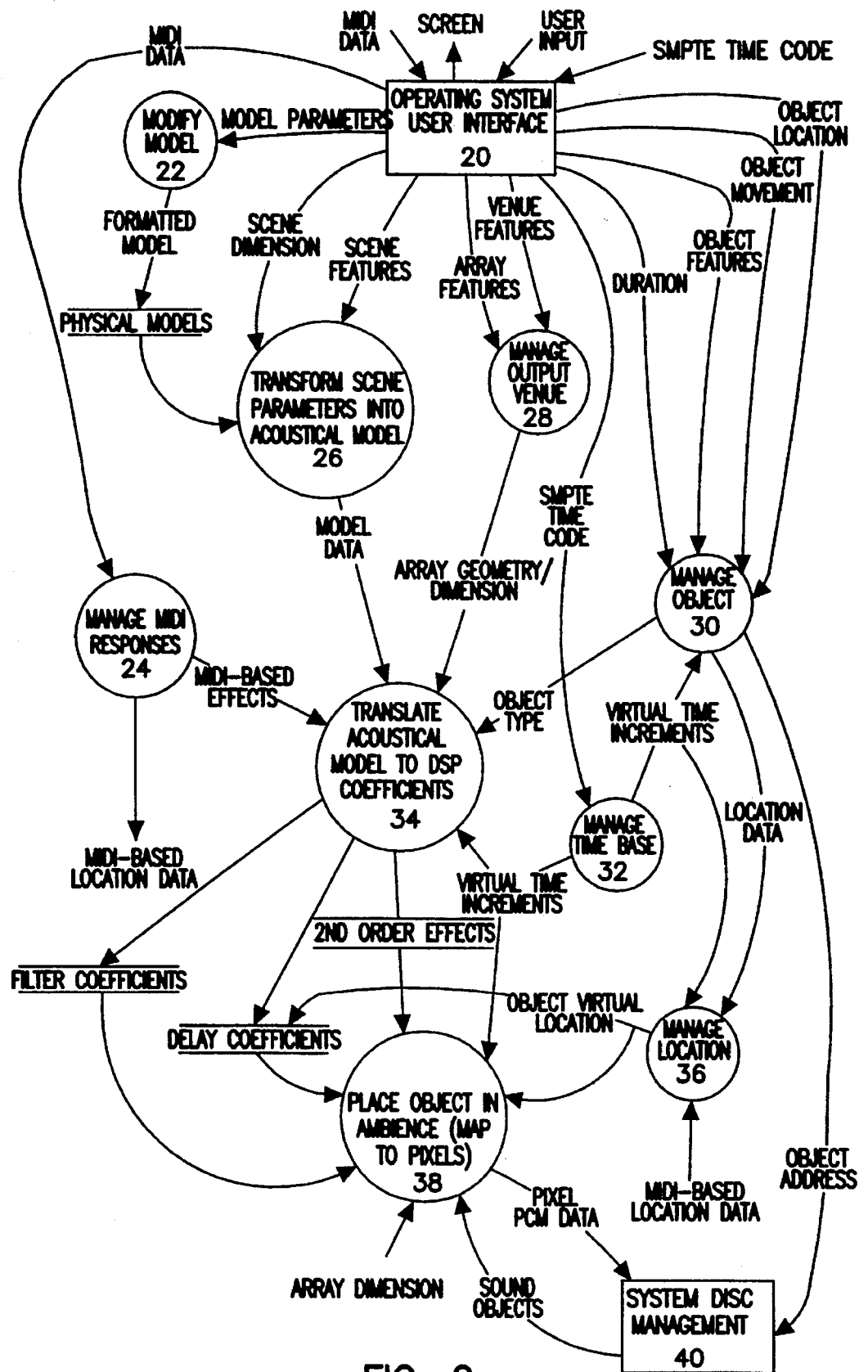
FIG. 2 is a dataflow diagram that further describes the functions of the computer-aided design (CAD) system in the present invention.

FIG. 2 is a dataflow diagram that further describes the functions of the computer-aided design (CAD) system 14 in the present invention. The sound designer first creates a graphical representation of the VAE. This is accomplished in a manner similar to prior art CAD systems by specifying dimensions, characteristics and parameters describing the VAE, including information relating to the perspective of the audience. These values may be specified by selecting values from a library of various acoustical characteristics such as reflection and absorption, or by selecting environments from a library of VAEs such as "listening rooms," "theaters," "concert halls," or other typical acoustical environments. In addition, these values may be derived empirically, for example, by sampling the frequency response of a similar space over time and frequency. The values specified for a VAE form the basis of the computations performed by the CAD system 14 that result in the data streams used to control the sound pixels in the sound reproducing surface 10.

The CAD system 14 of the present invention comprises an operating system and user interface 20, application modules 22–38, and system disc management module 40. The operating system and user interface 20 accepts various types of data, including user input, SMPTE time codes, and MIDI data. The operating system and user interface 20 also interacts with the operator and displays various information on a screen.

Initially, the operator specifies various parameters describing the VAE and the playback system. Model parameters identify the characteristics of the VAE, and are augmented by detailed information on the scene dimensions and features. Array features specify the configuration of a particular playback system. Venue features are provided to describe characteristics of the playback venue.

Application module 22 is used by the operator to modify the VAE model. In the preferred embodiment, the VAE model can be configured in a number of ways, for example, analytically or empirically. The VAE model may include standardized parameters from a look-up table of previously stored or standardized VAE models. The look-up table may include numerous references to acoustical properties of spaces and materials.

Application module 24 is used by the operator to manage MIDI data input the CAD system 14. Typically, application module 24 generates MIDI-based location data and MIDI-based effects for use within the VAE.

The VAE model is used by application module 26 to transform parameters such as the scene dimension and scene features into an acoustical model. The application module 24 can display a visual representation of this acoustical model for the operator.

Application module 28 accepts parameters for sound pixel array features and venue features to generate data representing venue acoustics and array geometry/dimensions. The array geometry/dimensions describe the configuration of the venue surfaces, which can be flat or circular surfaces, so that the acoustical energy can be accurately mapped onto the sound pixels 12. In addition, the geometry/dimensions describe the prospective of the audience in the venue. Venue acoustics may represent the frequency responses of the various materials in the venue.

Once the VAE is modeled to the satisfaction of the operator, sound objects can be placed and manipulated within the VAE. Application module 30 provides the general functions for managing sound objects. For example, when creating a new sound object, the application module 30 accepts data representing the object features, object movement, object location and duration.

Application module 32 manages the time base for all activities in the VAE. For example, all movement and action of sound objects in the VAE are identified by a time line reference. Application module 32 also accepts SMPTE time codes to synchronize the sound objects to external events. Application module 32 produces virtual time increments for use by other modules in synchronizing and referencing activities within the VAE.

Application module 34 translates the acoustical model into the DSP coefficients and programming necessary to drive the sound pixels. These DSP coefficients and programming include filter coefficients, 2nd order effects, and delay coefficients. Application module 34 uses the venue acoustics and geometry/dimensions to achieve this function.

Application module 36 manages the location of sound objects in the VAE using location data from application module 30, virtual time increments from application module 32, and MIDI-based location data from application module 24. Application module 36 produces object virtual location data which is used to modify the delay coefficients.

Application module 38 is used to place sound objects in the ambience of the VAE, i.e., it maps sound objects to sound pixels 12 in accordance with the time line reference indicated by the virtual time increments. Application module 38 accepts filter coefficients, delay coefficients, 2nd order effects, virtual timing increments, object virtual locations, sound objects, and array dimensions to perform these functions. Application module 38 transforms this data to create PCM data for the sound pixels, which is stored as discrete data streams for later retrieval by system disc manager 40. System disc manager 40 also retrieves sound objects from storage for manipulation by application module 38.

Sound Reproducing Surface

Figure 3:
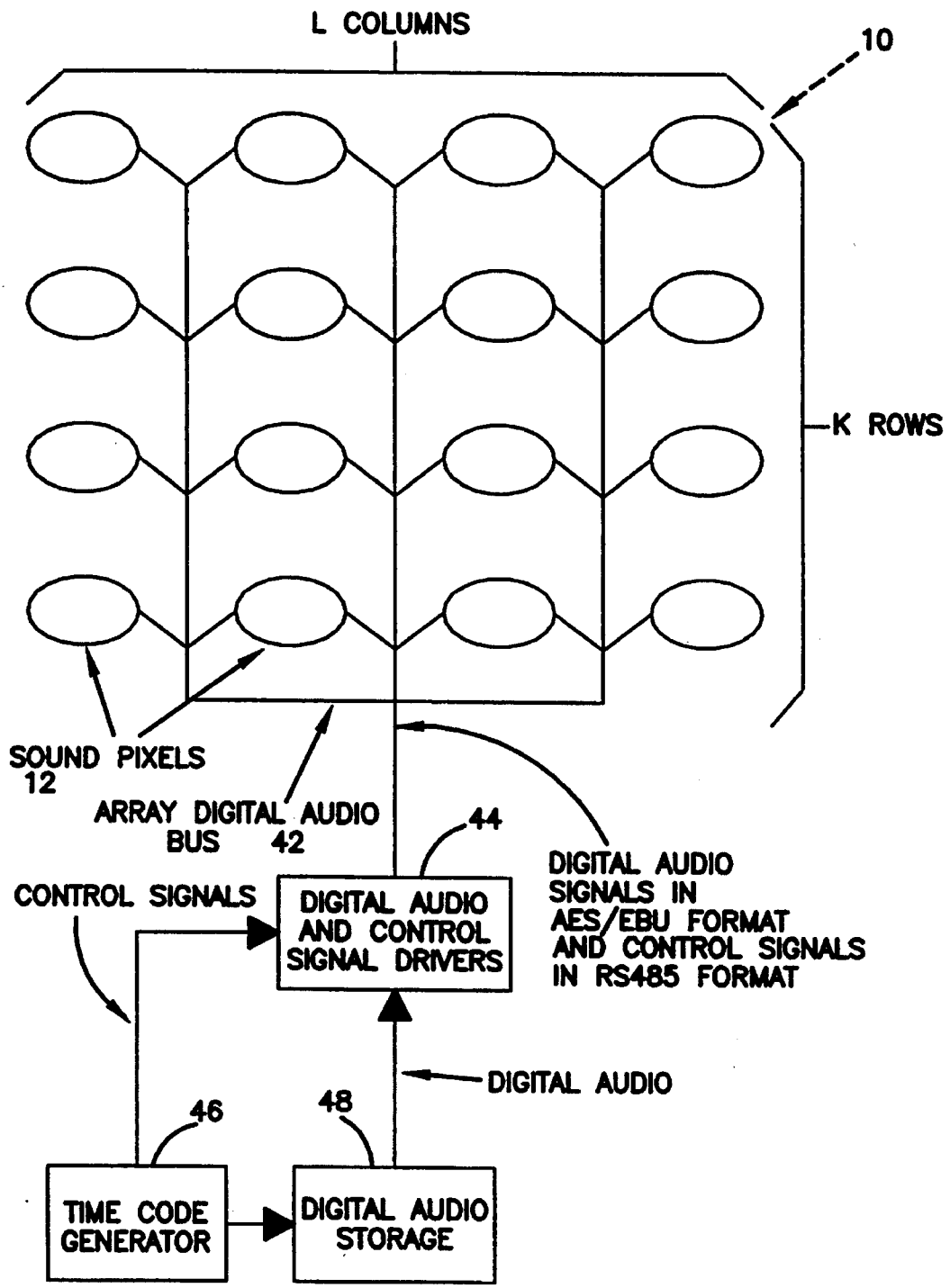
FIG. 3 is a block diagram illustrating the components of the sound reproducing surface and its electronics, wherein playback occurs in a static mode.

FIG. 3 is a block diagram illustrating the components of the sound reproducing surface 10 and its electronics, wherein playback occurs in a static mode. In static mode, the energy dispersion profiles and object location parameters assigned by the CAD system 14 are fixed and do not respond to changes in real-time conditions. Static mode provides a bare-bones embodiment of the present invention, wherein the focus is on solving the basic system problems, providing a solid foundation for other embodiments, and yet creating very sophisticated sound reproduction.

The sound reproducing surface 10 has a plurality of addressable sound pixels 12, typically comprising audio transducers arranged in L columns and K rows. The pixels 12 are coupled via bus 42 to digital and audio and control signal drivers 44. A time code generator 46 is coupled to the drivers 44 as well as a digital audio storage device 48, which can be any commercial device for storing the data streams such as a CD-ROM or a hard disk. The data streams are read from the digital audio storage device 48 and passed to the drivers 44 to control the operation of pixels 12. Preferably, the drivers 44 transmit digital audio signals to the pixels 12 in AES/EBU format and transmit control signals to the pixels 12 in RS485 format. The time code generator 46 provides a reference clock to both the drivers 16 and the storage device 18 for synchronizing the transmission of the data streams to the pixels 12. The pixels 12 decode and amplify the digital audio signals in accordance with the control signals. Essentially, the sound pixels 12 provide a distributed active speaker array with integral digital-to-analog converters.

The sound reproducing surface 10 is preferably deformable and thus the sound pixels 12 can be arranged into any 2-dimensional or 3-dimensional configuration. In some high-end video venues, the surface 10 may be curved in an arc of 270 degrees or more to correspond to the curvature of a screen. In other applications, such as in theme parks, the surface 10 may curved into a spherical shape. On the other hand, some installations may only need a surface 10 with a flat, planar shape. The point is that playback architecture is flexible enough to accommodate a wide range of requirements.

The number of sound pixels 12 comprising the sound reproducing surface 10 are also flexible. As with an imaging system, the larger the number of energy producing elements, the greater the resolution of the reconstructed "image." In the present invention, some applications may require only a small number of pixels 12, while other applications may require large numbers of pixels 120 Typically, the number of sound pixels 12 will not be a function of physical constraints, but rather of cost and space considerations. In more advanced "virtual reality" systems, it is conceivable that there could be many thousands of sound pixels 12 incorporated into a sound reproducing surface that encloses participants in a 360 degree sphere for complete realism in sound reproduction.

Figure 4:
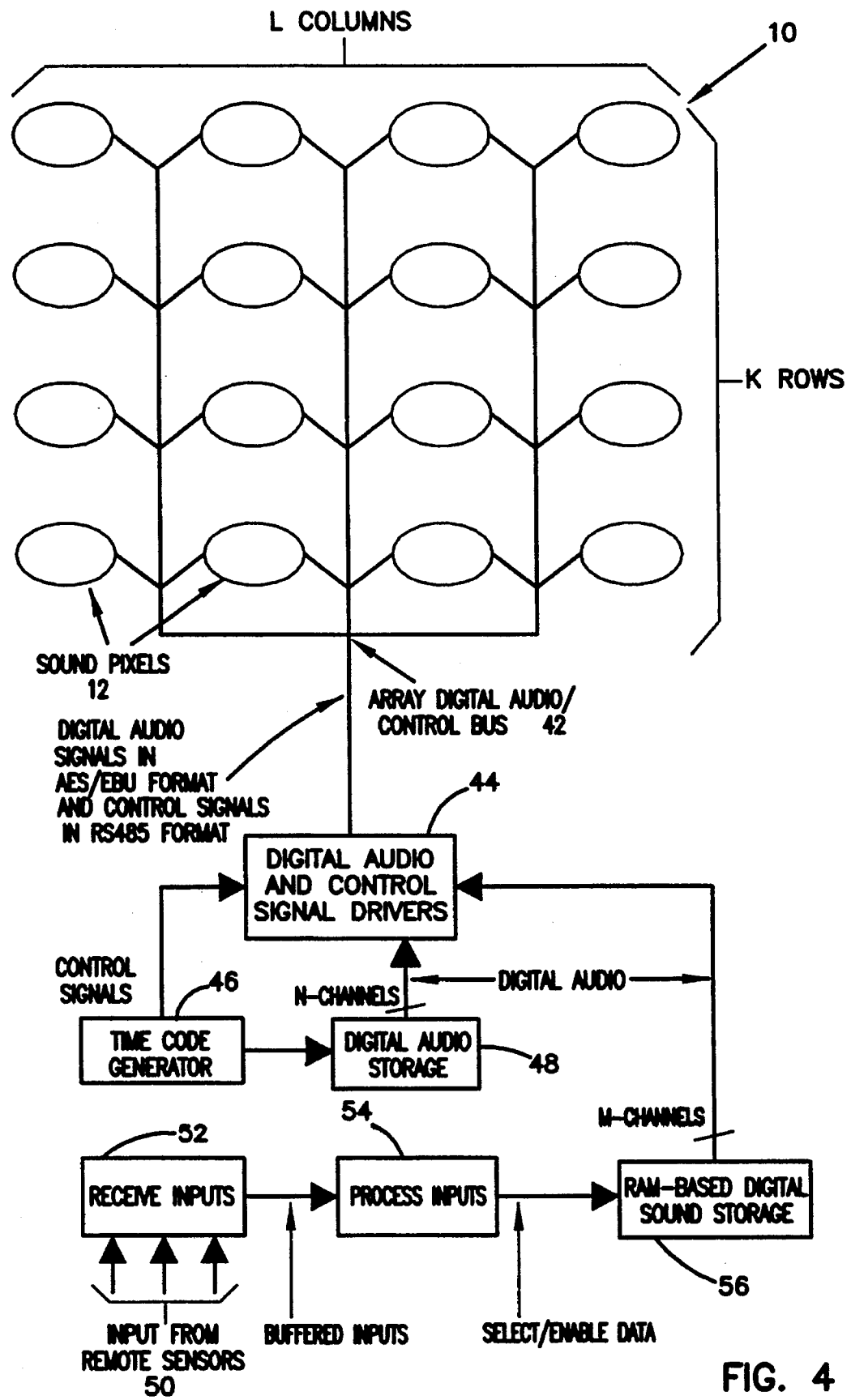
FIG. 4 is a block diagram illustrating the components of the sound reproducing surface and its electronics, wherein playback occurs in a static mode with responsive inputs.

FIG. 4 is a block diagram illustrating the components of the sound reproducing surface 10 and its electronics, wherein playback occurs in a static mode with responsive inputs. For example, one embodiment of the invention would be to add input from remote sensors 50 which could be a control pad or joy stick, infrared sensors, ultrasound sensors, or other apparatus well known in the art. The inputs from these remote sensors 50 would be received at 52 and processed at 54 to provide select/enable signals for determining which data streams are retrieved from a data storage device 56. The data streams retrieved from the digital storage 56 would be combined with or controlled or modified by the data streams retrieved from the storage device 48.

Figure 5:
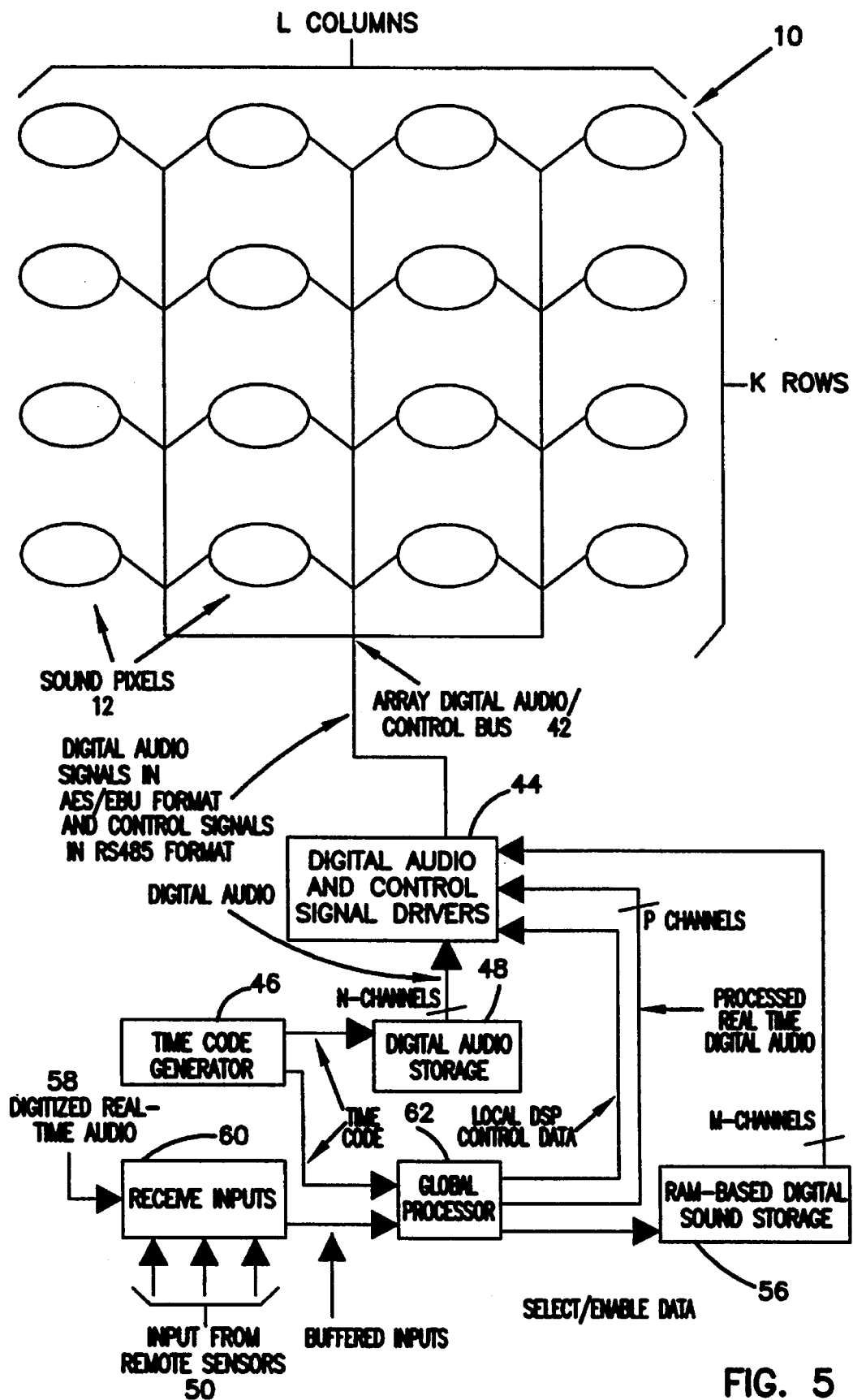
FIG. 5 is a block diagram illustrating the components of the sound reproducing surface and its electronics, wherein playback occurs in a dynamic mode with responsive inputs and real-time audio.

FIG. 5 is a block diagram illustrating the components of the sound reproducing surface and its electronics, wherein playback occurs in a dynamic mode with responsive inputs and real-time audio. For example, one embodiment of the invention would be to add digitized real-time audio 50 from one or more microphones. These real-time inputs 50, as well as the inputs from the remote sensors 50, would be received at 60 and processed at 62 to provide select/enable signals for determining which data streams are retrieved from the data storage device 56. Further, processor 62 can generate local DSP control data and P channels of real-time digital audio data streams. The data streams retrieved from the digital storage 48 and the storage device 56 could be combined with the real-time audio data streams.

Figure 6:
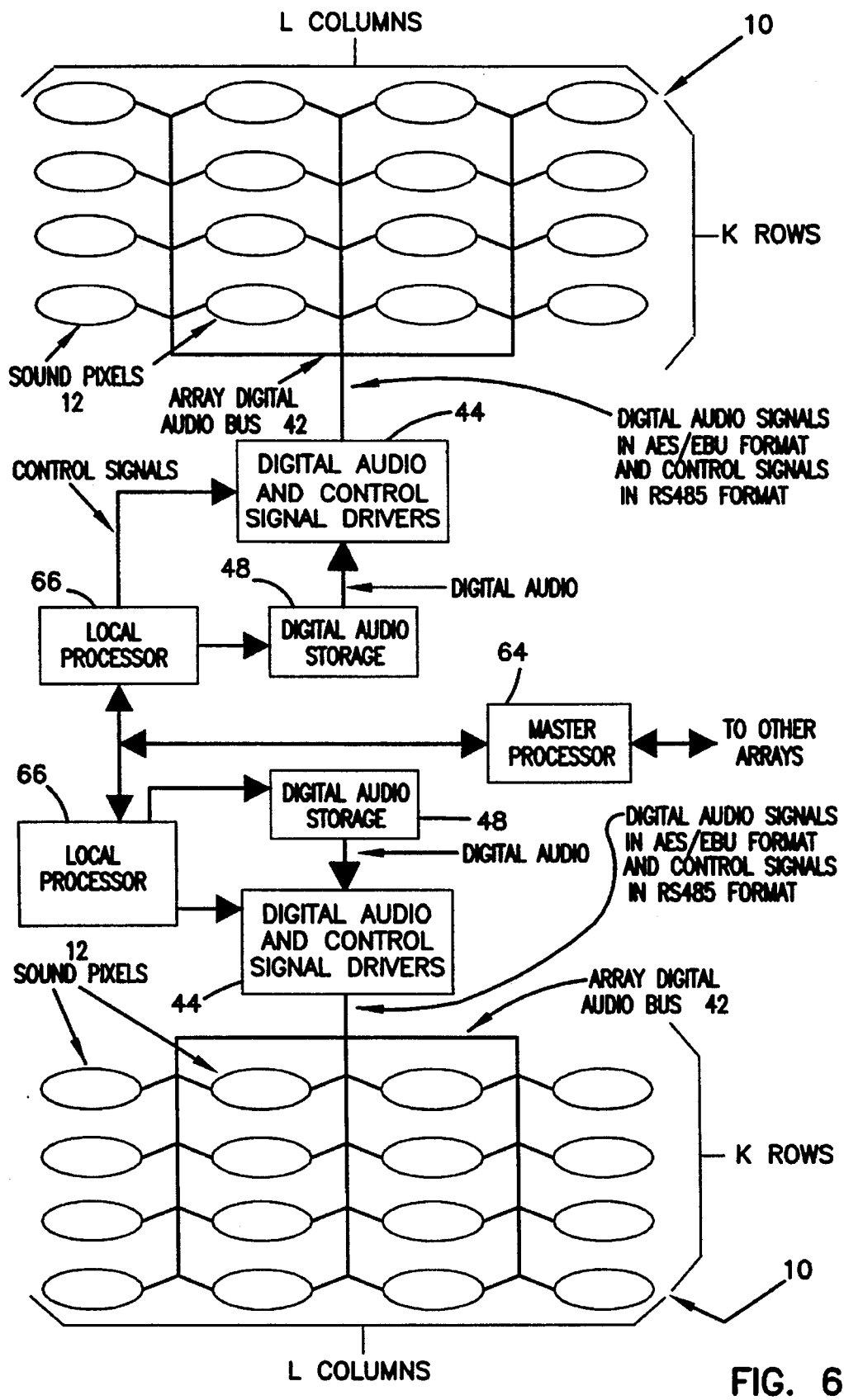
FIG. 6 is a block diagram illustrating the components and interconnections of a plurality of sound reproducing surfaces.

FIG. 6 is a block diagram illustrating the components and interconnections of a plurality of sound reproducing surfaces. A master processor 64 is interconnected to a plurality of playback systems and controls the interaction therebetween. The master processor 64 is coupled to a local processor 66 controlling a particular array of sound pixels 12. Each local processor 66, in turn, is coupled to digital audio and control signal drivers 44, and digital audio storage 48.

Figure 7:
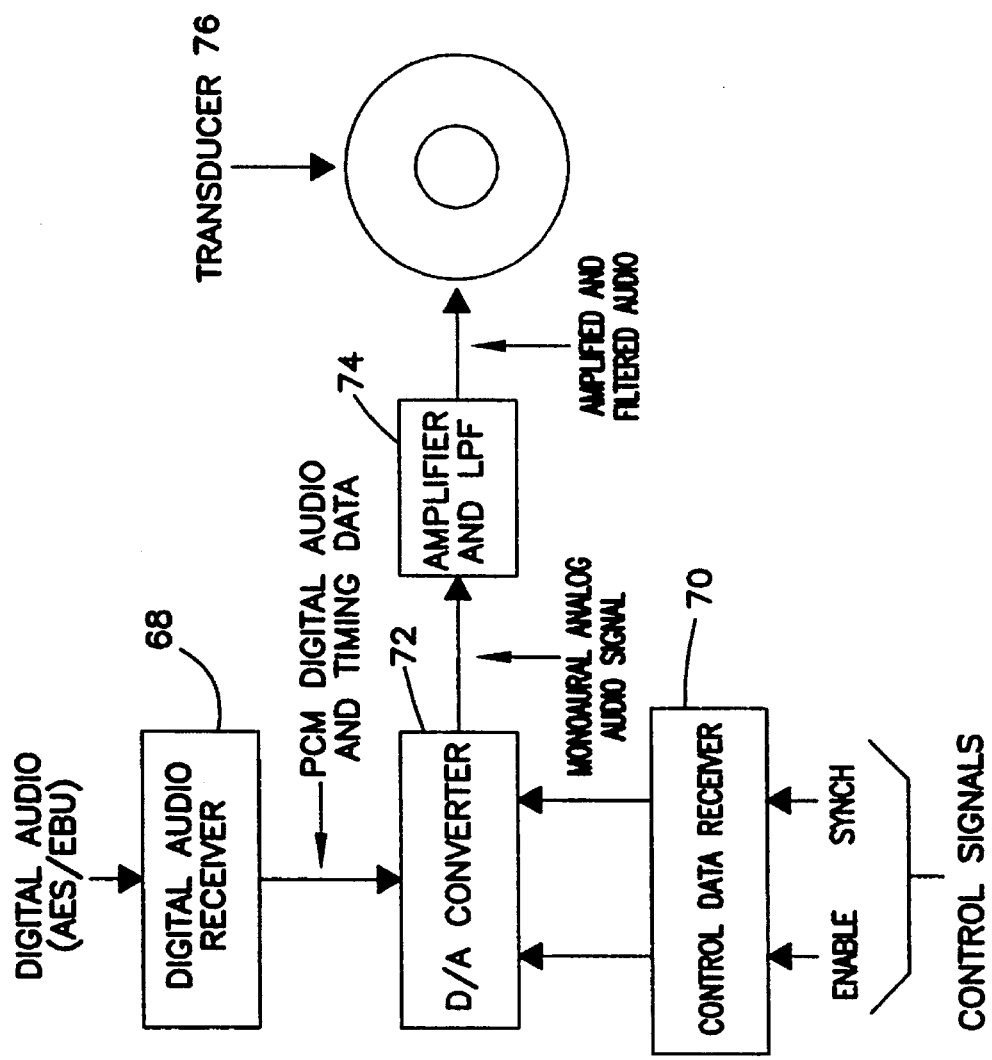
FIG. 7 is a block diagram illustrating the components of a static sound pixel using global digital signal processing.

FIG. 7 is a block diagram illustrating the components of a static sound pixel 12 using global digital signal processing. The sound pixel 12 receives digital audio data at a receiver 68 and control signals at a receiver 70. The digital audio receiver 68 processes and transforms the digital audio signals into pulse code modulation (PCM) digital audio and timing data. The control data receiver 70 processes the control signals, which are comprised of enable and synchronization data, and transmits the enable and synchronization signals to the D/A converter 72. The D/A converter 72 transmits a monaural analog audio signal to an amplifier and low pass filter (LPF) 74 for driving the transducer 76 of the sound pixel 12.

Figure 8:
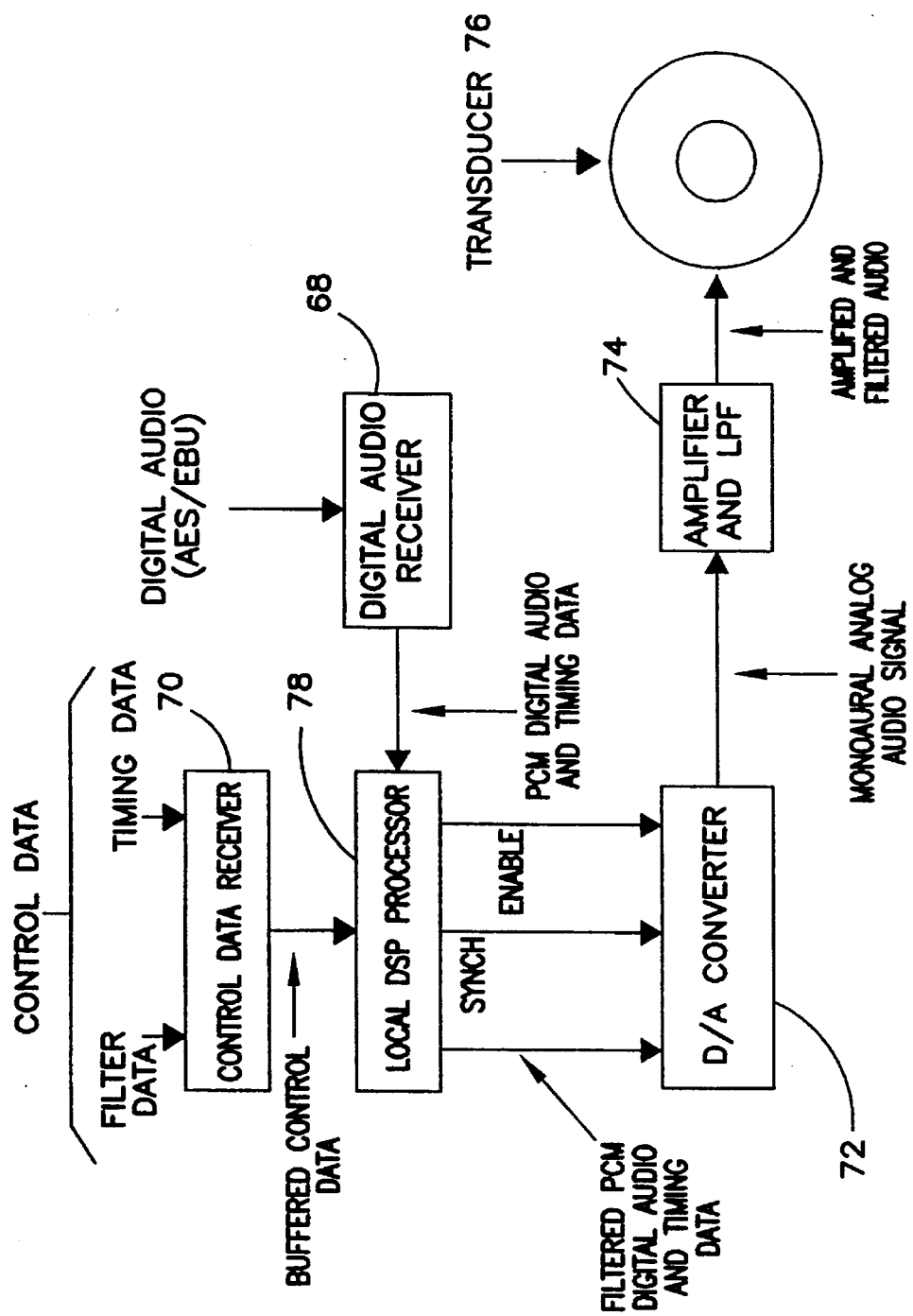
FIG. 8 is a block diagram illustrating the components of a dynamic sound pixel using local digital signal processing.

FIG. 8 is a block diagram illustrating the components of a dynamic sound pixel 12 using local digital signal processing. In this embodiment, a local DSP 78 processes the digital audio data and control signals. The DSP 78 transforms the digital audio signals and control data into PCM digital audio and timing data, synchronization data, and enable data, for transmission to the D/A convertor 72.

Figure 9:
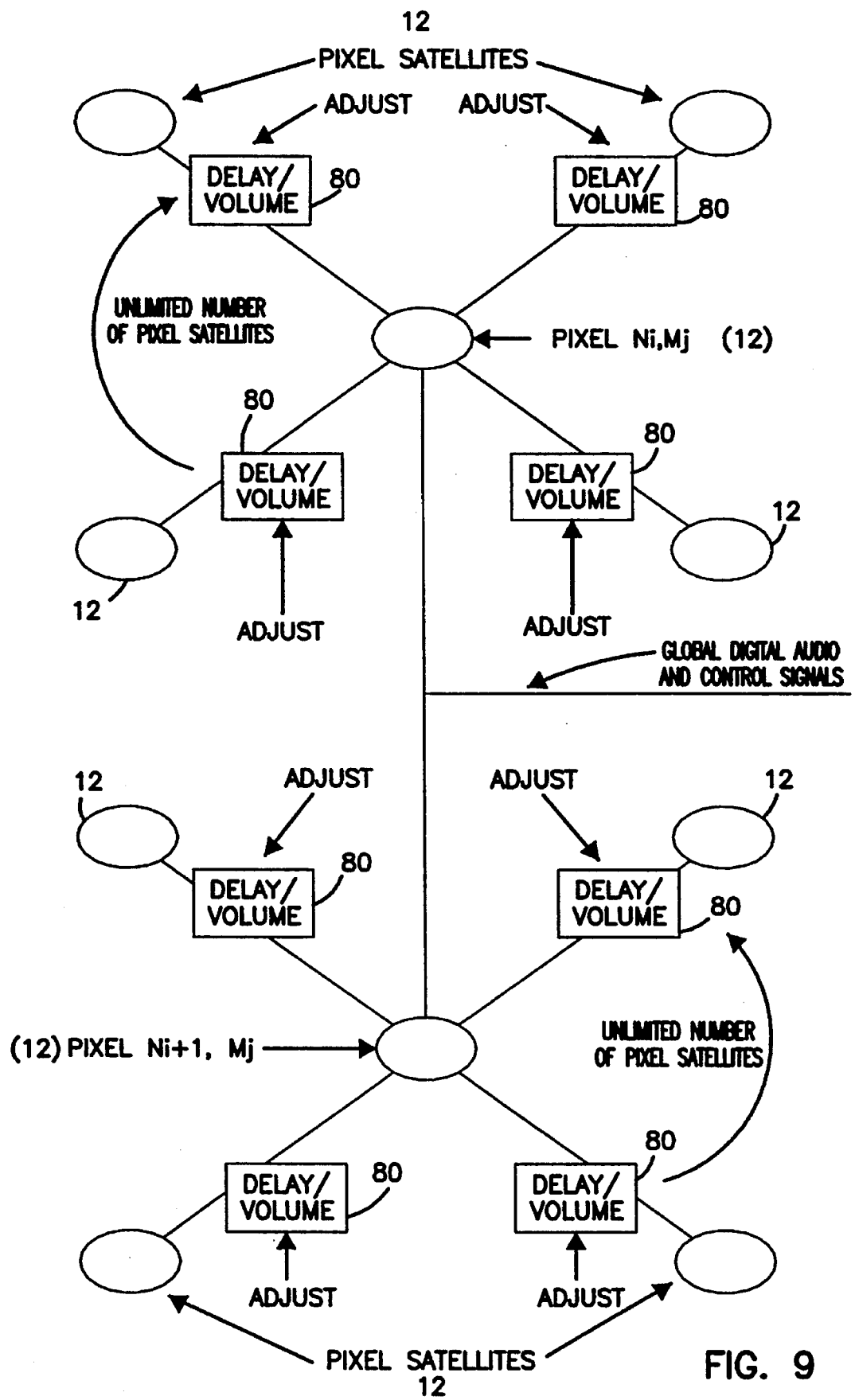
FIG. 9 is a block diagram illustrating the components of a satellite network for sound pixels.

FIG. 9 is a block diagram illustrating the components of a satellite network for sound pixels 12. In this embodiment, digital audio and control signals transmitted to "master" sound pixels 12 are simultaneously provided to "satellite" sound pixels 12. Satellite sound pixels 12 include components 80 to alter or other process the data streams transmitted to the master sound pixel 12. The satellite sound pixel 12 may alter characteristics such as gain, delay, or perform filtering of the data streams.

Figure 10:
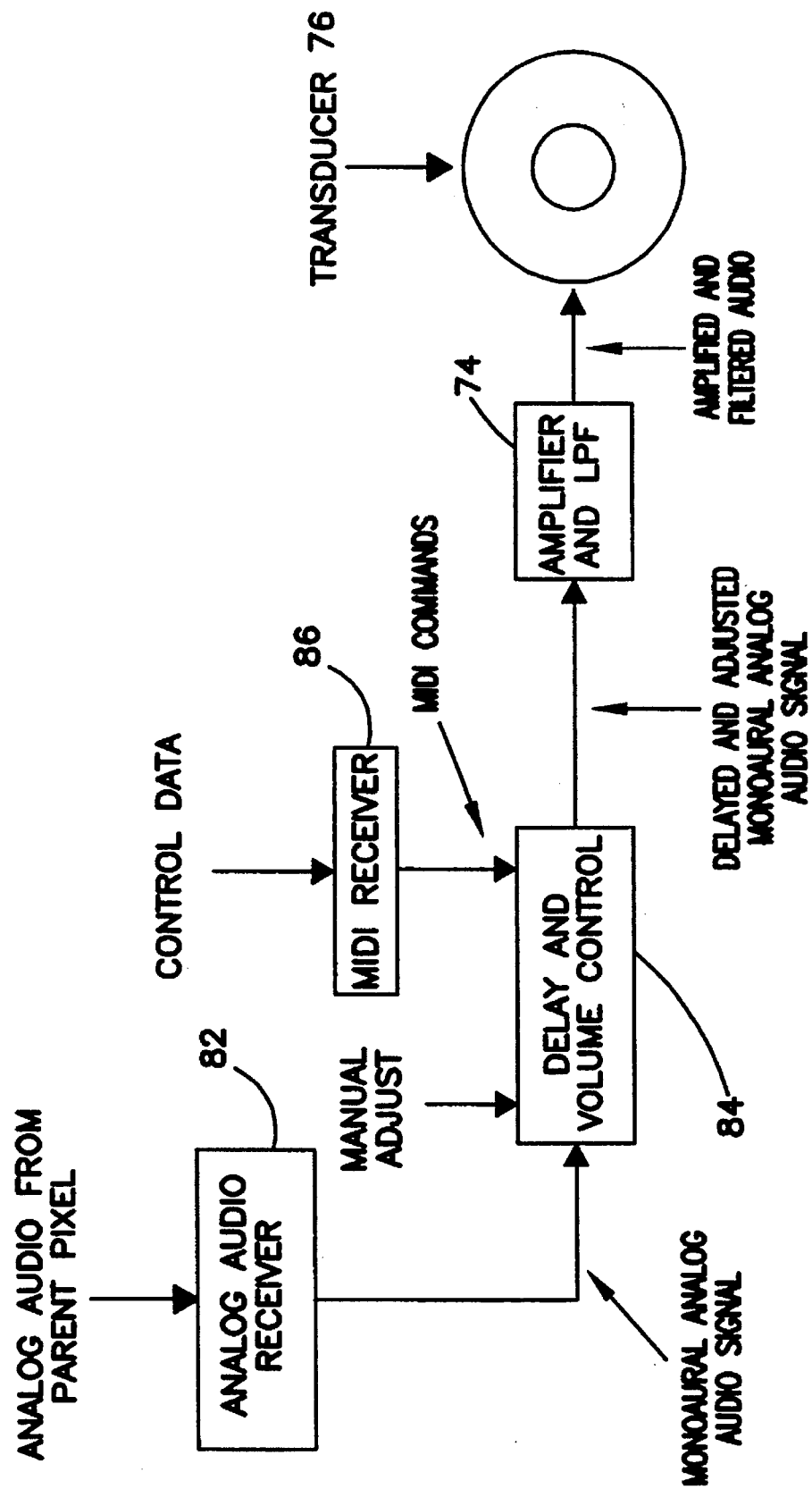
FIG. 10 is a block diagram illustrating the components of a satellite sound pixel with analog signal processing.

FIG. 10 is a block diagram illustrating the components of a satellite sound pixel 12 with analog signal processing. In this embodiment, the satellite sound pixel 12 receives analog audio signals from the master sound pixel at receiver 82. The analog audio signals are modified by a delay and volume control circuit 84. The delay and control circuit 84 is controlled by a manual adjust or by MIDI commands received by receiver 86. The output of the delay and volume control circuit 84 is amplified and filtered at 74 before driving the transducer 76.

Figure 11:
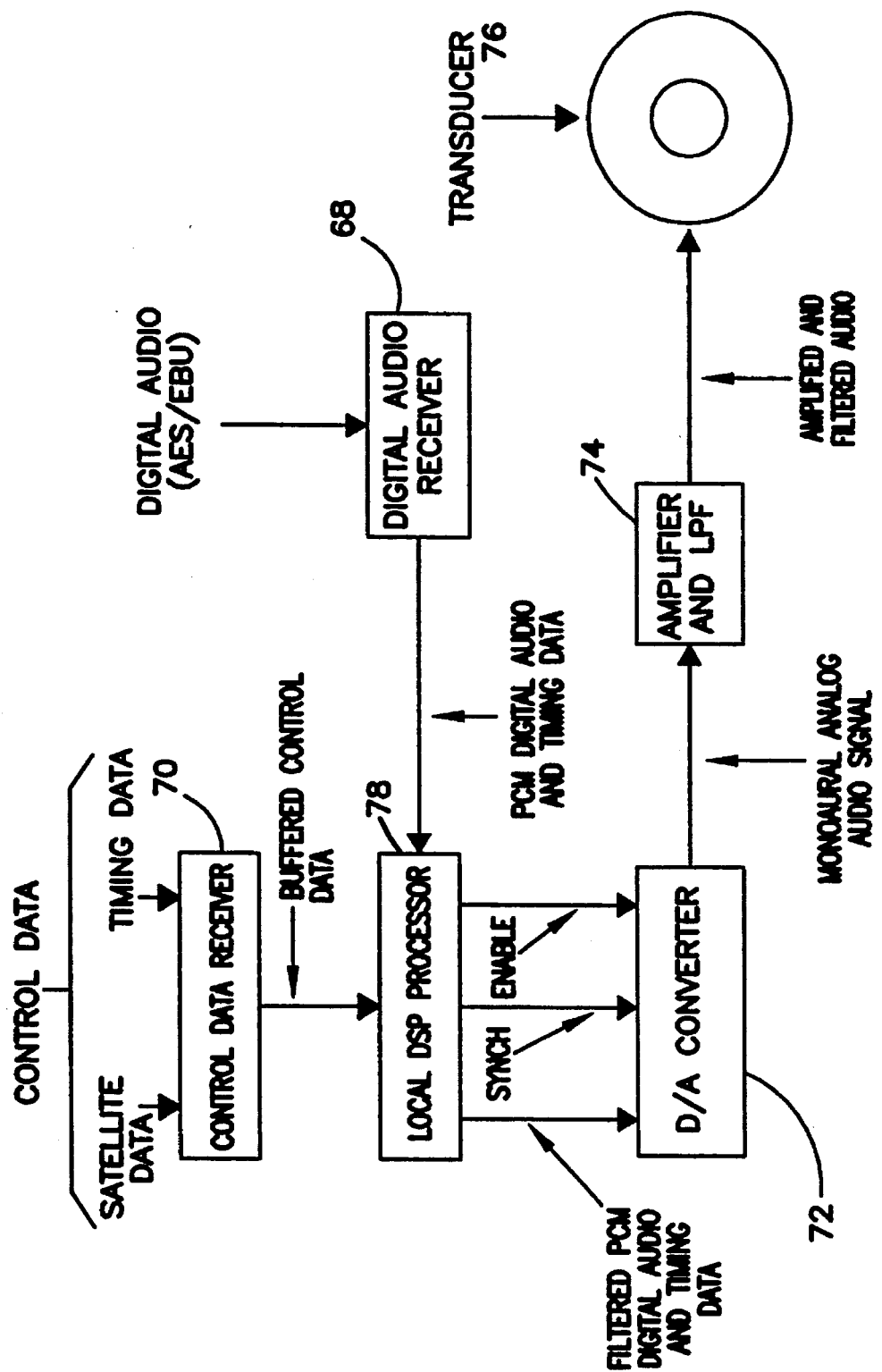
FIG. 11 is a block diagram illustrating the components of a satellite sound pixel with analog signal processing.

FIG. 11 is a block diagram illustrating the components of a satellite sound pixel 12 with analog signal processing. In this embodiment, a local DSP 78 processes the digital audio data and control signals transmitted to the master sound pixel. The DSP 78 transforms the digital audio signals and control data into PCM digital audio and timing data, synchronization data, and enable data, for transmission to the D/A convertor 72, amplifier and low pass filter 74, and transducer 76.

Figure 12:
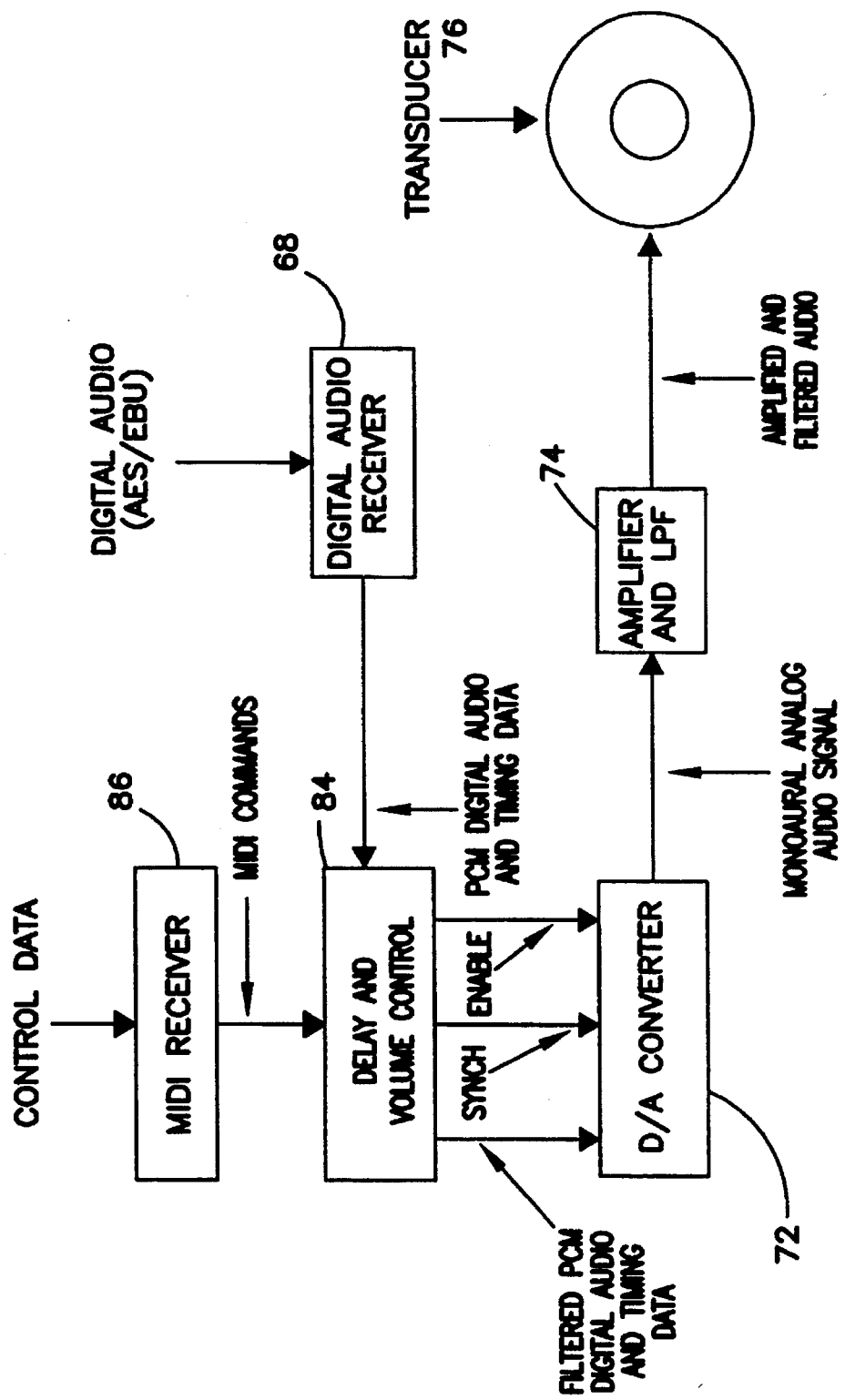
FIG. 12 is a block diagram illustrating the components of a satellite sound pixel utilizing digital processing and having a MIDI interface.

FIG. 12 is a block diagram illustrating the components of a satellite sound pixel 12 utilizing digital processing and having a MIDI interface. In this embodiment, MIDI commands received by a MIDI receiver 86 are used to control the delay and volume control circuit 84.

Figure 13:
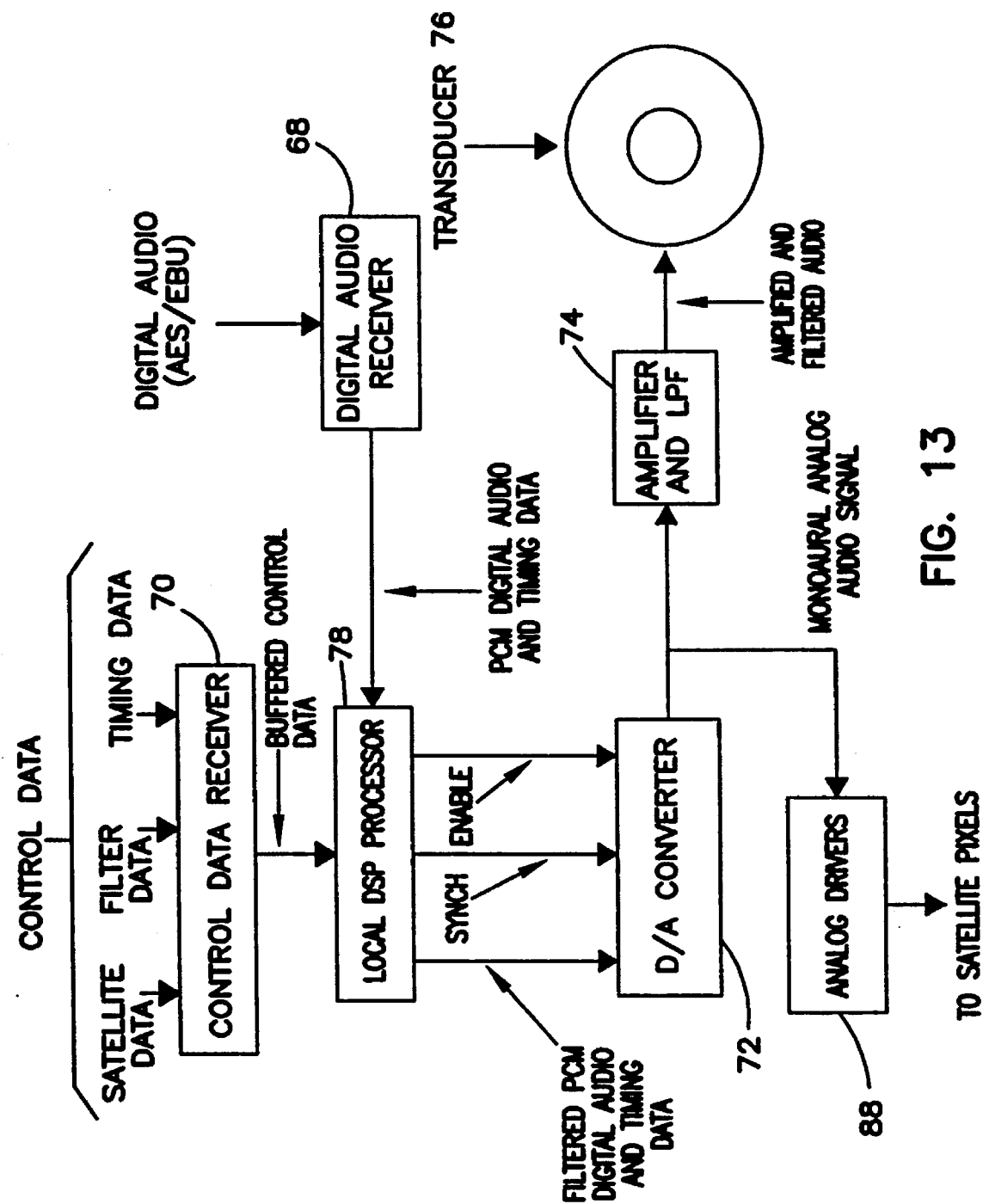
FIG. 13 is a block diagram illustrating the components of a satellite sound pixel utilizing digital processing and having analog output to other satellite sound pixels.

FIG. 13 is a block diagram illustrating the components of a satellite sound pixel 12 utilizing digital processing and having analog output to other satellite sound pixels 12. In this embodiment, a local DSP 78 processes the digital audio data and control signals transmitted to the master sound pixel 12. The control signals include satellite data, filtering data, and timing data. The DSP 78 transforms the digital audio signals and control data into PCM digital audio and timing data, synchronization data, and enable data, for transmission to the D/A convertor 72. The output of the D/A converter 72 is used to drive the amplifier and low pass filter 74 and transducer 76, as well as being shared with other satellite sound pixels 12 via analog drivers 88.

Figure 14:
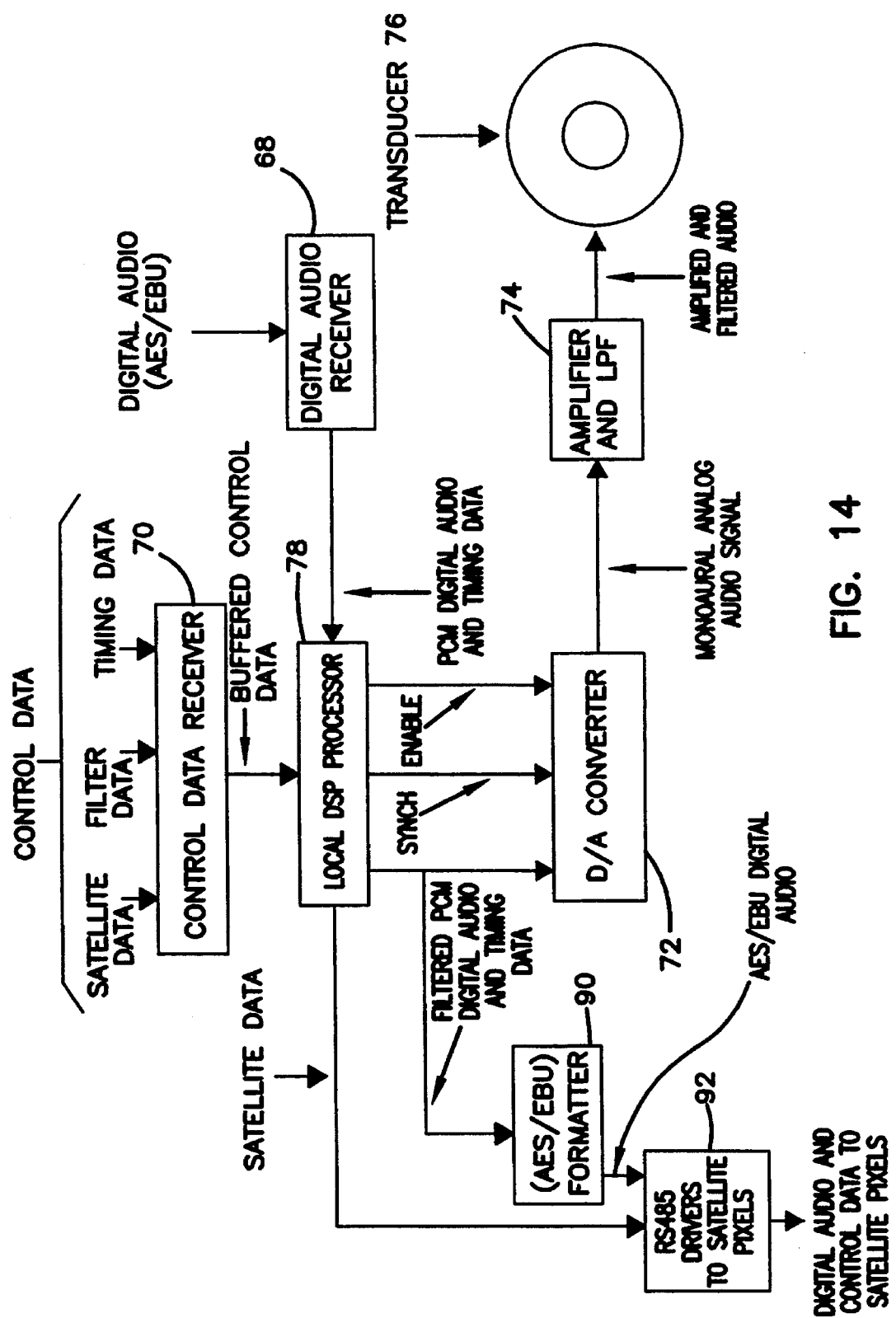
FIG. 14 is a block diagram illustrating the components of a satellite sound pixel utilizing digital processing and having digital output to other satellite sound pixels.
Figure 15A:
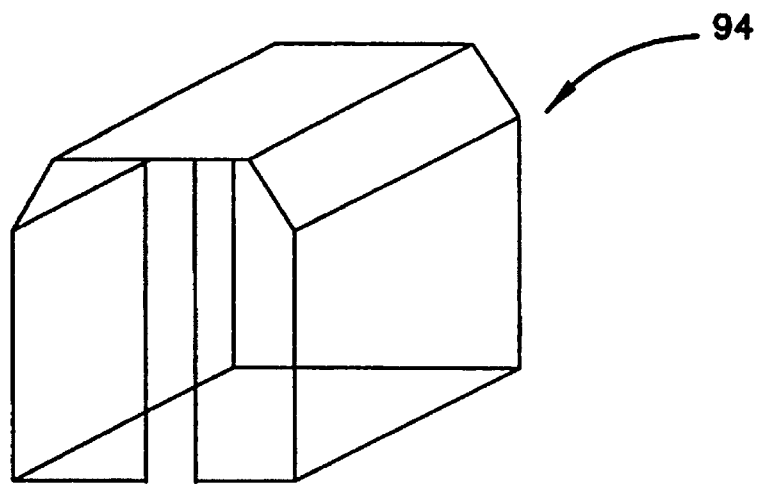
FIGS. 15A–15D are block diagrams illustrating various perspective views of a sound bubble constructed according to the teachings of the present invention.
Figures 15B, 15C:
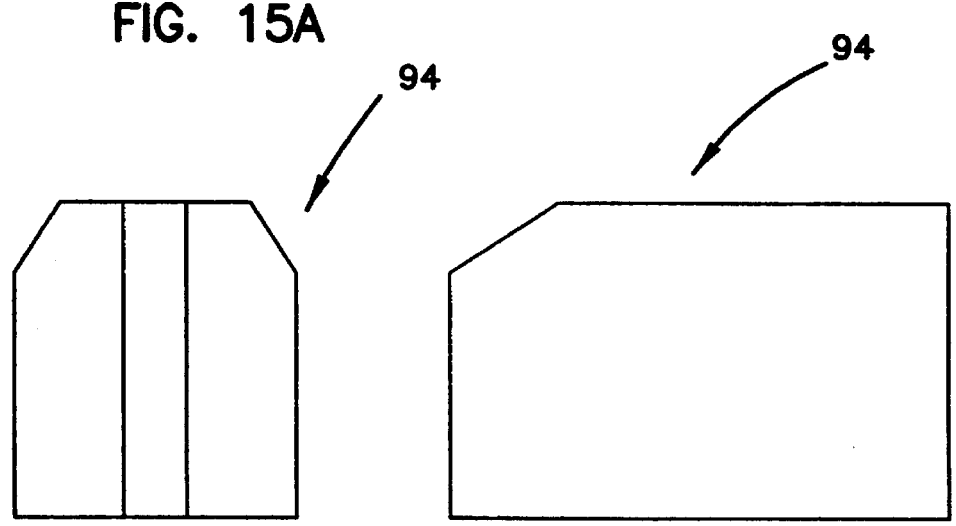
Figure 15D:
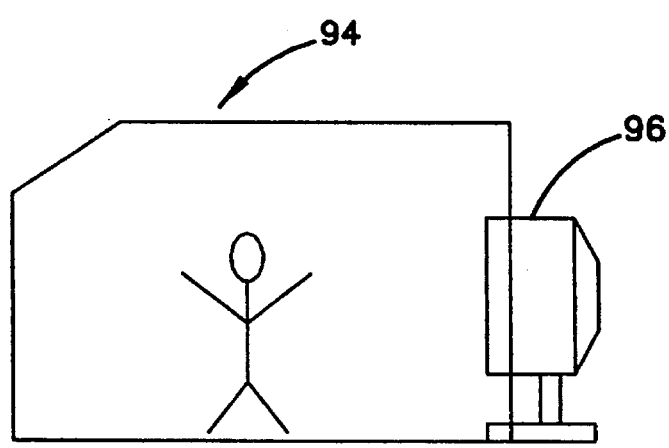

FIG. 14 is a block diagram illustrating the components of a satellite sound pixel 12 utilizing digital processing and having digital output to other satellite sound pixels 12. In this embodiment, the local DSP 78 outputs filtered PCM digital audio and timing data to an AES/EBU formatter 90 and RS485 driver 92, as well as the D/A converter 72.

Sound Bubble

FIGS. 15A–15D are block diagrams illustrating various perspective views of a sound bubble 94 or sound tent constructed according to the teachings of the present invention. The walls of the sound bubble 94 are formed by the sound reproducing surface 10 of the present invention. Generally, the surface 10 will comprise a fabric incorporating various numbers of sound pixels 12. Moreover, the enclosure may include a monitor 96 for use in generating video images. The sound bubble 94 is primarily intended as an enhancement to video games. Another embodiment would incorporate the sound bubble 94 into a helmet or visor or other similar personal device.

Figure 16A:
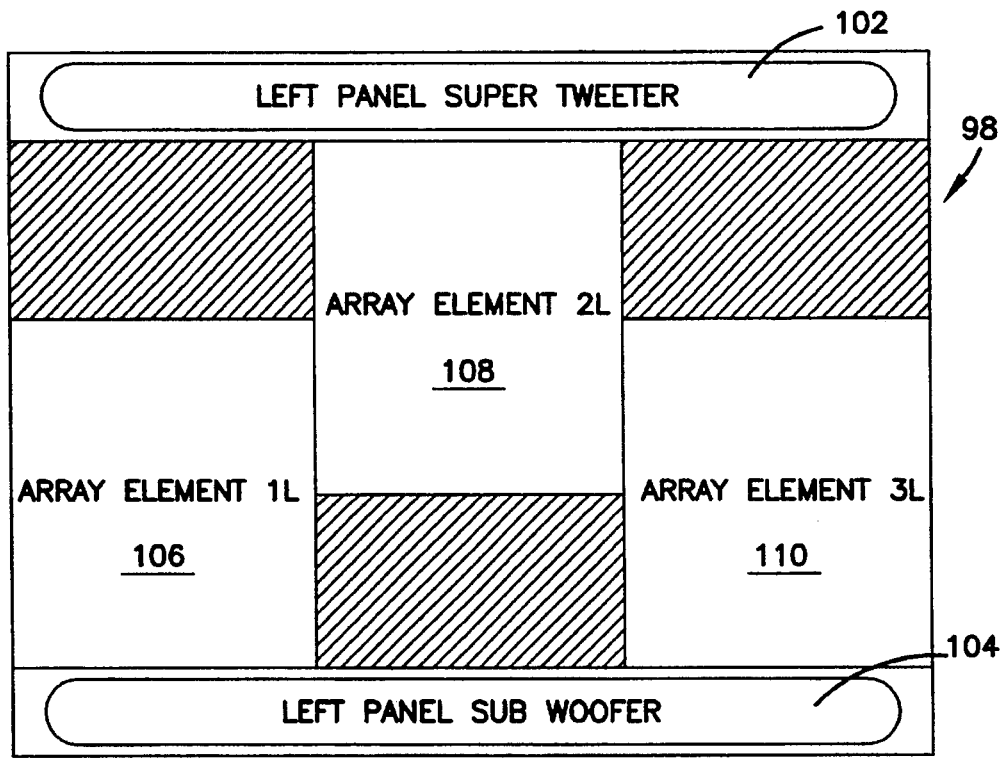
FIGS. 16A and 16B show the left panel and right panel of the sound bubble.
Figure 16B:
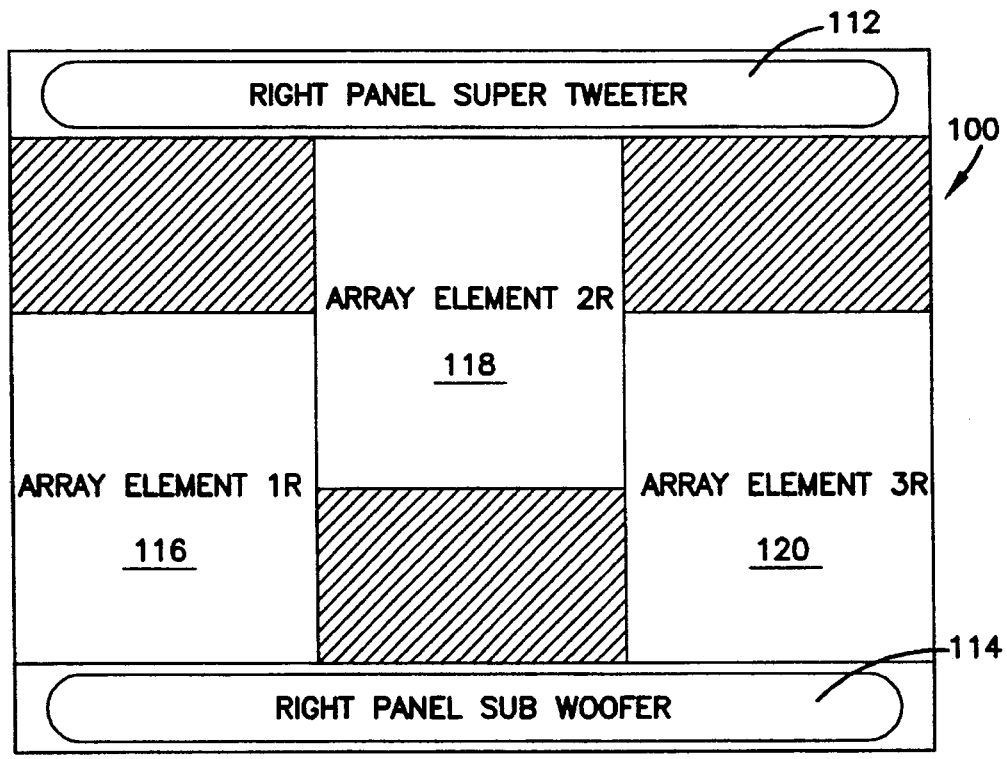

FIGS. 16A and 16B show the left panel 98 and right panel 100 of the sound bubble 94, which can include a soft speaker configuration. The left panel 96 includes a super tweeter 102 and sub woofer 104. Between the super tweeter 102 and sub woofer 104 are array elements or sound pixels 106–110 (also labeled as 1L, 2L, and 3L). The right panel 100 also includes a super tweeter 112 and sub woofer 114 and array elements or sound pixels 116–120 (also labeled as 1R, 2R, and 3R).

Figure 17:
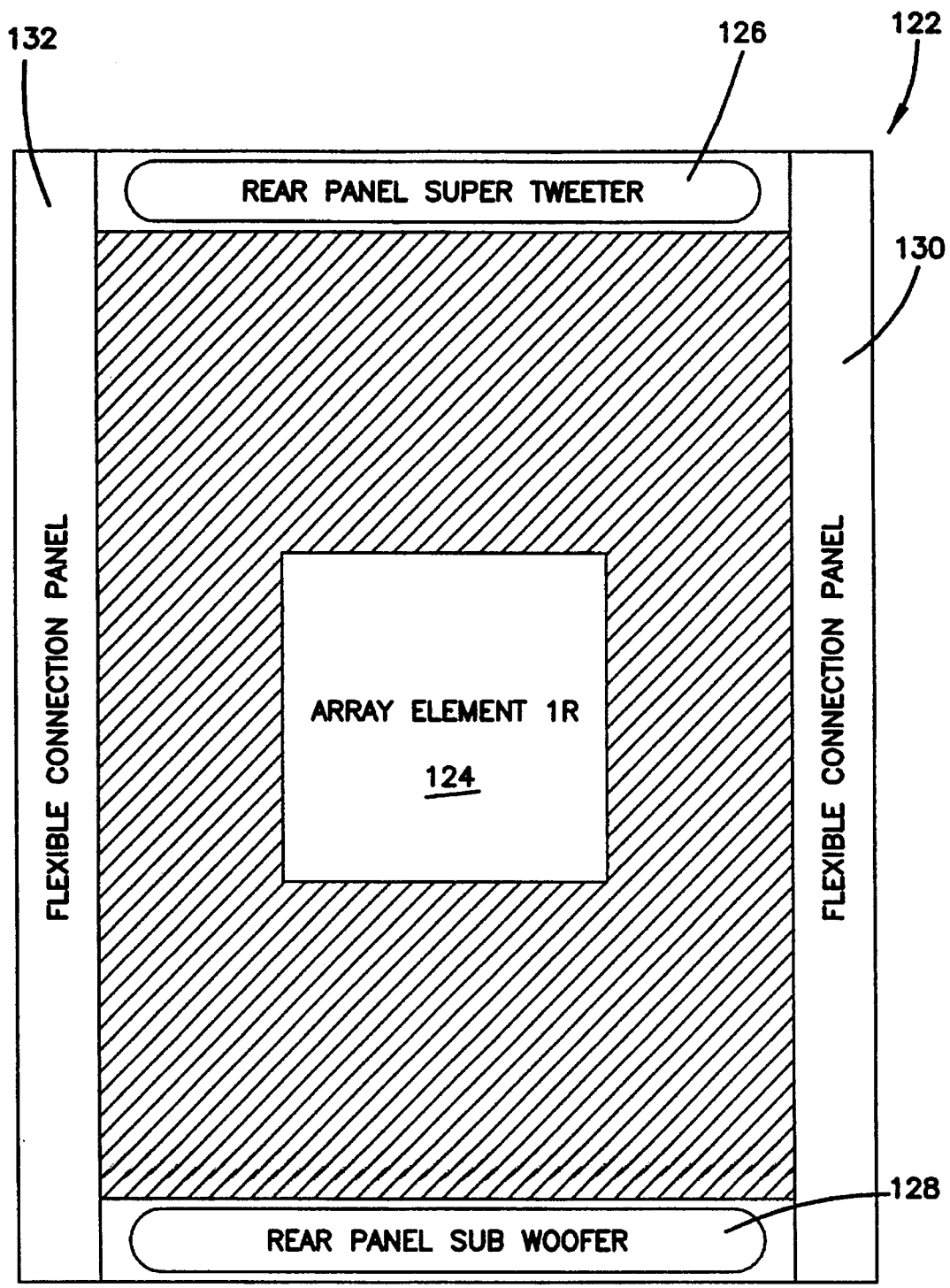
FIG. 17 shows the rear panel of the sound bubble.

FIG. 17 shows the rear panel 122 of the sound bubble 94, which has one array element or sound pixel 124 (also labeled as 1R) located between a super tweeter 126, a sub woofer 128, and two flexible electrical connection panels 130 and 132.

Figure 18:
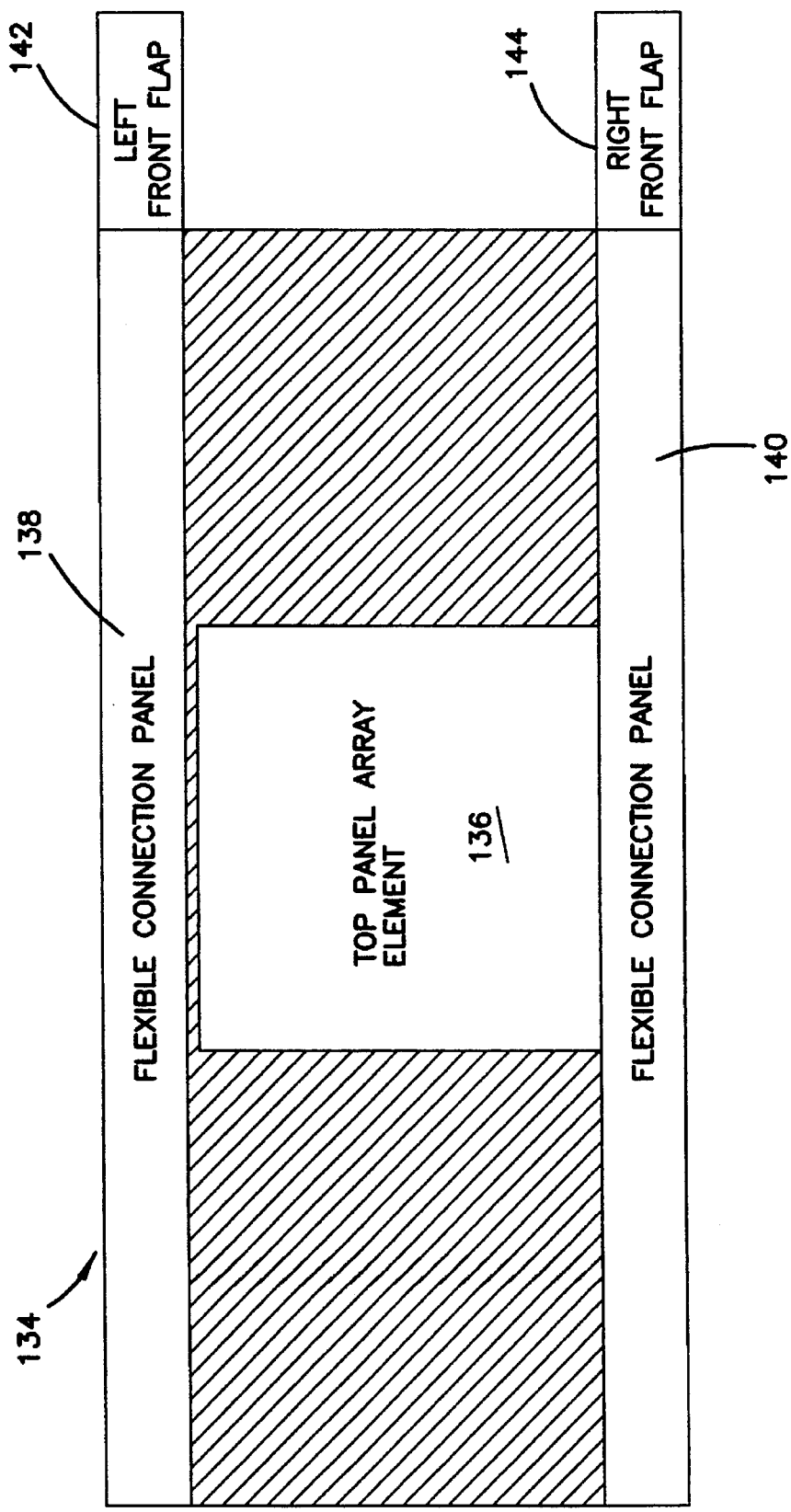
FIG. 18 shows the top panel of the sound bubble.

FIG. 18 shows the top panel 134 of the sound bubble 94, which has one array element or stand pixel 136 located between two flexible connection panels 138 and 140 on each respective side of top panel 134. The flexible connection panels 138 and 140 each have a front flap 142 and 144 respectively located at an end.

Figure 19:
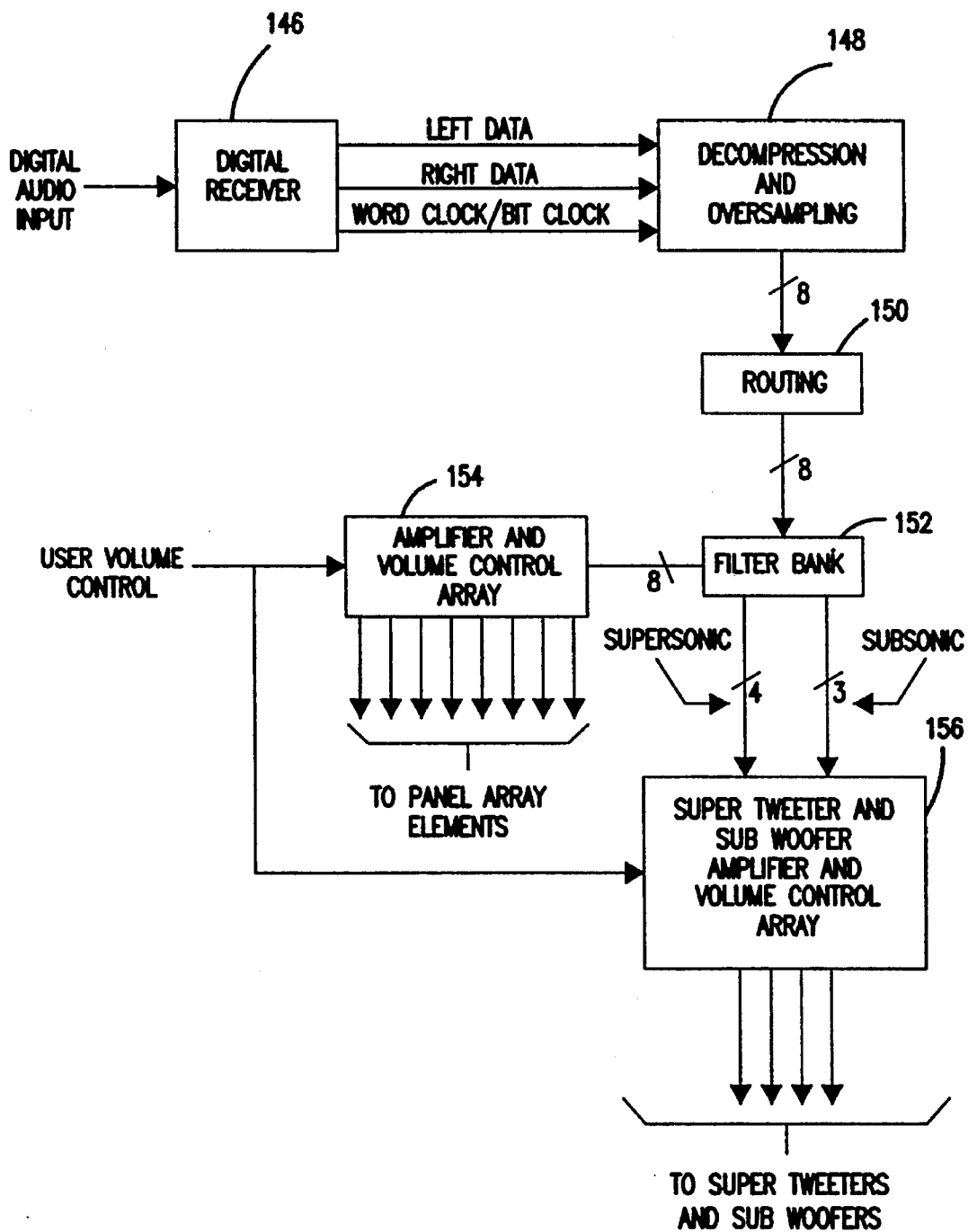
FIG. 19 is a block diagram of the electronic components used to control the operation of the sound bubble.

FIG. 19 is a block diagram of the electronic components used to control the operation of the sound bubble 94. The input typically comprises digital audio input received from, for example, a CD-ROM or cartridge game. The digital audio is fed into a digital receiver 146, which processes and transforms the digital audio input into left data, right data, and word clock/bit clock. All data processed by digital receiver 146 is sent to a decompression and oversampling device 148. The decompression and oversampling device 148 then processes and transforms the left data, right data, and word clock/bit clock into an 8 bit digital signal, which is sent to a routing device 150 which routes the 8 bit digital signals to a filter bank 152. The filter bank 152 generates eight signals for the array elements, four supersonic signals for the super tweeters, and three subsonic signals for the sub woofers. The eight signals for the array elements are sent to an amplifier and volume control array 154, which also receives user volume control input. The amplifier and volume control array 154 produces signals for the array elements or sound pixels 12. The four supersonic signals for the super tweeters and the three subsonic signals for the sub woofers are sent to super tweeter and sub woofer amplifier and volume control array 156, which also receives user volume control input. The super tweeter and sub woofer amplifier and volume control array 156 mixes the user volume control input, supersonic signals, and subsonic signals and sends the resulting signals to the super tweeters and sub woofers.

Conclusion

This concludes the description of the preferred embodiment of the invention. The foregoing description of the preferred embodiment has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A sound reproducing system, comprising:

(a) a computer having data storage means attached thereto, wherein the computer comprises means for decomposing audio material into a plurality of discrete sound data streams and means for storing the sound data streams on the data storage means; and (b) an audio playback system, coupled to the data storage means, comprised of a plurality of acoustical energy generating elements, wherein the acoustical energy generating elements each comprise a discrete, addressable output location, the audio playback system further comprising means for retrieving the sound data streams from the data storage means and means for controlling the acoustical energy generating elements in response to the retrieved sound data streams.

2. The invention set forth in claim 1 above, wherein the computer further comprises means for creating a model of an acoustical playback environment, means for creating a model of propagating acoustical energy within the acoustical playback environment, and means for transforming the model of propagating acoustical energy into the sound data streams.

3. The invention set forth in claim 1 above, wherein the acoustical energy generating elements each comprises a full range audio transducer that generates sound under control of the sound data streams.

4. The invention set forth in claim 1 above, wherein the audio playback system further comprising dynamic mode means for modifying the sound data streams in response to external stimuli.

5. A sound reproducing system, comprising:

(a) a deformable two-dimensional sound reproducing surface comprised of a plurality of sound pixels, wherein the sound pixels comprise addressable transducers for generating acoustical energy;

(b) a storage device, coupled to the surface, for storing a plurality of data streams, wherein each data stream comprises one or more elements of an acoustical energy source; and (c) processing means, coupled to the surface and the storage device, for retrieving at least one data stream from the storage device and for transmitting the data streams to specific sound pixels, wherein the sound pixels are synchronized and interlinked by the data streams to reproduce a time line of the acoustical energy source radiating and moving through space.

6. The invention as set forth in claim 5 above, further comprising means for accepting input from remote sensors that track movement of an object.

7. The invention as set forth in claim 6 above, further comprising means for modifying the data streams in response to the input from the remote sensors.

8. The invention as set forth in claim 5 above, further comprising means for accepting audio input and for modifying the data streams in response thereto.

9. The invention as set forth in claim 5 above, further comprising a plurality of satellite sound pixels coupled to one of the sound pixels.

10. The invention as set forth in claim 9 above, wherein each satellite sound pixel further comprises means for receiving and processing the data streams for the coupled sound pixel to alter sound generating characteristics therein.

11. The invention as set forth in claim 10 above, wherein the altered sound generating characteristics are selected from a group comprising gain, delay, and frequency.

12. The invention as set forth in claim 5 above, further comprising means for interconnecting multiple sound reproducing surfaces to each other.

13. A sound design system, comprising a computer having a monitor and data storage coupled thereto, the computer comprising means for modeling acoustical properties of a three dimensional space, means for modeling acoustical characteristics of a propagating acoustical energy source in the three dimensional space, means for translating the modeled acoustical properties and the modeled acoustical characteristics into a plurality of data streams, wherein each of the data streams controls one of a plurality of transducers in a transducer array.

14. The invention as set forth in claim 13 above, wherein the three dimensional space is represented as a graphical object displayed on the monitor coupled to the computer.

15. The invention as set forth in claim 14 above, wherein the acoustical energy source is represented as a graphical object displayed on the monitor coupled to the computer.

\* \* \* \* \*

UNITED STATES PATENT AND TRADEMARK OFFICE
CERTIFICATE OF CORRECTION

PATENT NO. :     5,517,570

DATED      :     May 14, 1996

INVENTOR(S) :    Stephen F. Taylor

It is certified that error appears in the above-identified patent and that said Letters Patent is hereby corrected as shown below:

Column 6, line 37, "120" should read --12--; and
Column 6, line 37, before "Typically" insert a period --.--.

Signed and Sealed this

Twelfth Day of November, 1996

Attest:

BRUCE LEHMAN

Attesting Officer

Commissioner of Patents and Trademarks